A. BODE & K. BÖTTCHER.
WINDING MECHANISM FOR ELECTRIC JIB CRANES.
APPLICATION FILED JAN. 4, 1909.

1,003,976.

Patented Sept. 26, 1911.
11 SHEETS—SHEET 6.

A. BODE & K. BÖTTCHER.
WINDING MECHANISM FOR ELECTRIC JIB CRANES.
APPLICATION FILED JAN. 4, 1909.

1,003,976.

Patented Sept. 26, 1911.
11 SHEETS—SHEET 10.

UNITED STATES PATENT OFFICE.

ALFRED BODE AND KARL BÖTTCHER, OF BENRATH, NEAR DUSSELDORF, GERMANY.

WINDING MECHANISM FOR ELECTRIC JIB-CRANES.

1,003,976.	Specification of Letters Patent.	Patented Sept. 26, 1911.

Application filed January 4, 1909. Serial No. 470,630.

*To all whom it may concern:*

Be it known that we, ALFRED BODE and KARL BÖTTCHER, subjects of the German Emperor, and residents of Benrath, near Dusseldorf, Province of the Rhine, Germany, and whose post-office addresses are, respectively, Schlossallee, Benrath, near Dusseldorf, and 68 Graf Adolfstrasse, Dusseldorf, have invented certain new and useful Winding Mechanism for Electric Jib-Cranes, of which the following is a specification.

This invention relates to the winding mechanism of electric jib cranes, and though generally applicable, yet it is specially adapted for floating cranes of the type mounted upon a pontoon and comprising a bell-like structure carrying the mechanism and rotarily supported upon and surrounding a central stationary structure secured on the pontoon.

The invention is mainly directed to the mechanism operating the rope of the main or heavy-load hook, and to the mechanism raising and lowering the jib, with the object of enabling both mechanisms to be operated simultaneously to effect their purposes or independently without risk of damage to the crane structure, or of accidents arising with regard to the suspended load.

Other objects are generally to provide combinations of mechanism as constituent parts of a crane whereby its use will be rendered more effective as compared with the usual construction.

The invention is illustrated in the accompanying drawings with reference to which it will be described, and wherein:—

In these drawings only so much of the crane is shown in detail as is necessary for elucidation. The rotary mechanism-carrying structure 80, which is of any appropriate construction is mounted as usual upon a fixed central structure 81, and has a jib 82 pivoted to its upper left hand corner in the customary fashion.

The mechanisms for operating the rope 3 of the main hook 83 and the jib are driven by two electric motors 7 and 8 of the type and arrangement indicated, or any other that may be suitable. The said rope mechanism will be first described and subsequently the jib mechanism.

The former mechanism comprises two drums 1 and 2 whose shafts are mounted in bearings 5 and 6 and a capstan 4 whose shaft is mounted in a movable frame, the drums 1 and 2 being driven from the motors 7 and 8 and the capstan 4 from the drum 1 through gearing hereinafter more fully described. The rope 3 is wound several times around the drums 1 and 2 and then the slack is led to, and wound upon, the capstan 4, this being done because the rope 3 is frequently of a diameter of 60 millimeters, and in consequence, cannot be easily wound upon an ordinary drum, and because, too, it is often necessary to raise the load to a height of 50 meters or more so that about 400 meters of rope has to be wound up.

At the respective ends of the shaft of the motor 7 are keyed toothed wheels 9 and 11, the toothed wheel 11 being of smaller diameter than the toothed wheel 9. Corresponding wheels 10 and 12 are provided upon the shaft of the motor 8. The wheels 9 and 10 gear with a toothed wheel 14, and the wheels 11 and 12 with a toothed wheel 13. The toothed wheels 13 and 14 are loosely mounted upon a common shaft 13[a] supported in bearings 15 and adapted to be connected to, and disconnected from the shaft by suitable means such as friction clutches 16[1] and 17[1] operable by hand wheels 16 and 17 respectively. Keyed on the shaft of the wheels 13 and 14 is a toothed wheel 18 gearing with another toothed wheel 19 whose shaft 20 is mounted in the bearings 6 and 5 supporting the shafts of the drums 1 and 2 and carries a pair of toothed wheels 21 and 22, gearing respectively with toothed wheels 23 and 24, the former of which, 23, is rigidly connected to the drum 2 and the other, 24, to the drum 1. Therefore, according to the load, the drums are driven either by the mechanism 9, 10, 14, 18, 19, 21, 22, 23 and 24 at one speed, or 11, 12, 13, 18, 19, 21, 22, 23, and 24 at a higher speed.

Simultaneously with the rotations of the drums 1 and 2 the capstan 4 is driven for, as previously remarked, it is operated from the drum 1 to take up the slack rope and to do this properly, it is necessary to drive it at a slightly higher peripheral speed than the drums 1 and 2, and further, at the end of every revolution to move it laterally a distance corresponding to the thickness of the rope 3 so that the latter is wound regularly, while, again, when the limit of this lateral movement is reached it is necessary to automatically reverse the movement so that the next layer of rope is laid evenly over the preceding ones. These operations are accomplished as will now be explained.

Figure 5:
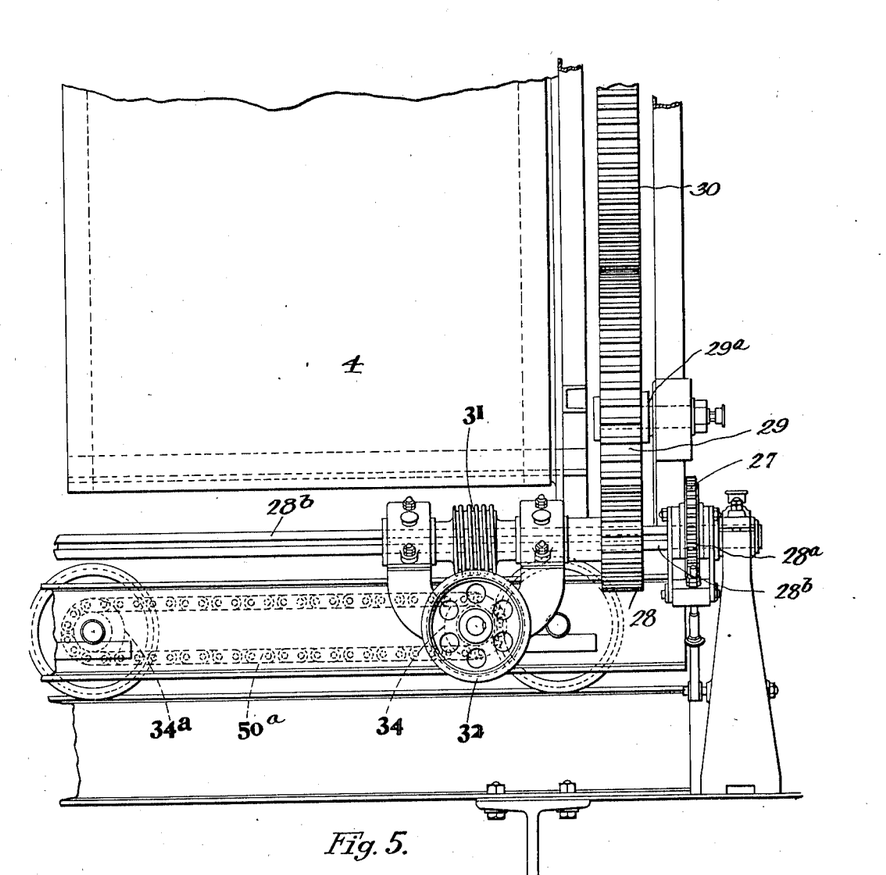
Fig. 5 is a part side elevation of the mechanism for moving the capstan laterally.
Figure 6:
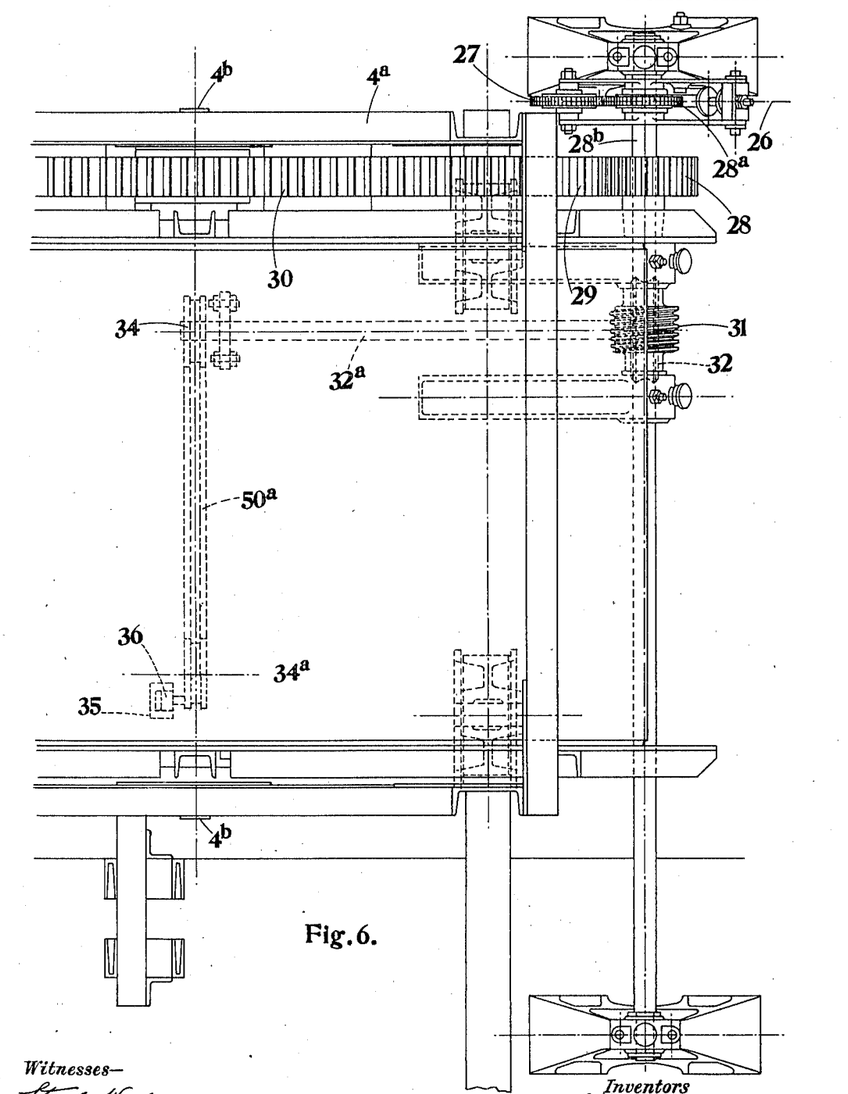
Fig. 6 is a plan corresponding to Fig. 5.
Figure 7:
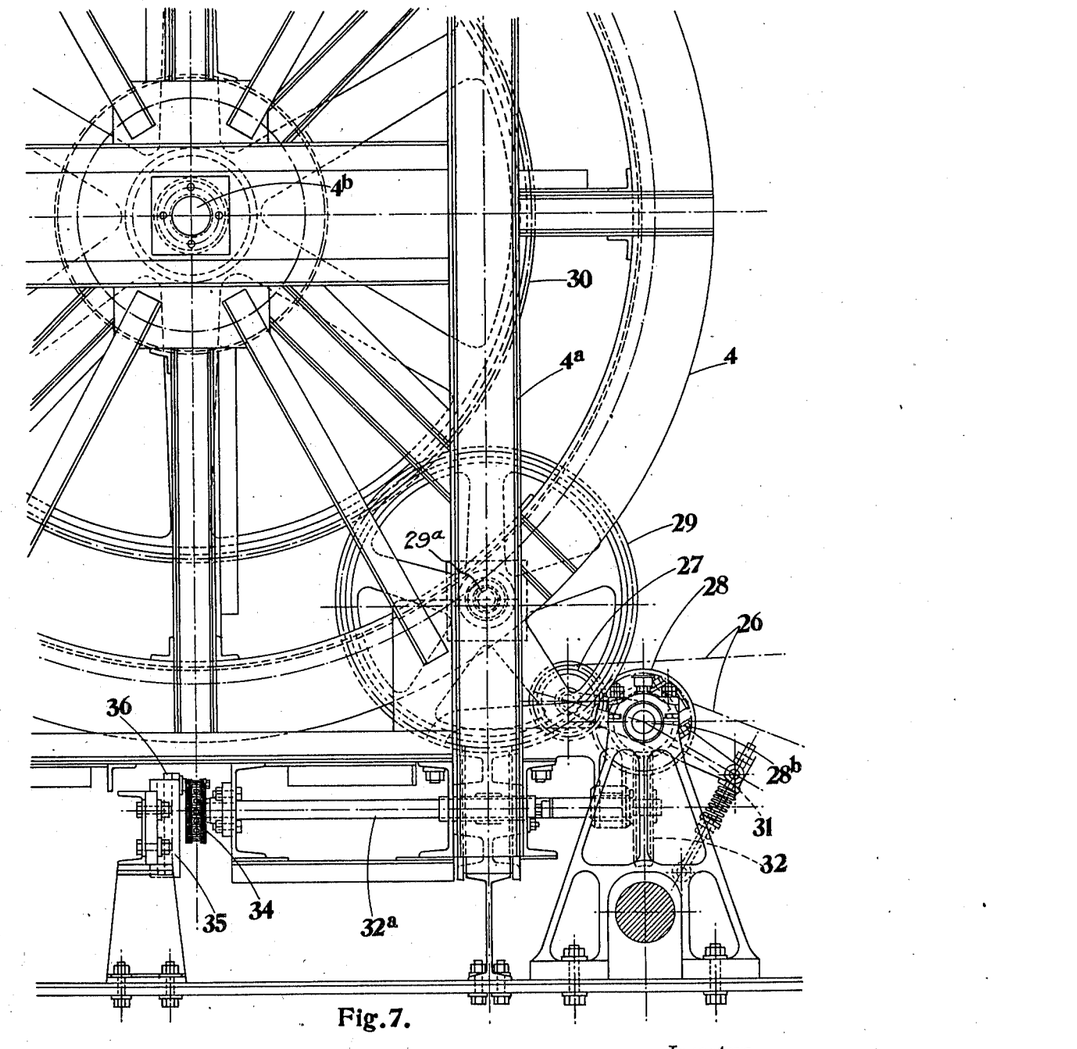
Fig. 7 is a front elevation corresponding to Figs. 5 and 6, and Figs. 8–11 show details to an enlarged scale.
Figure 8:
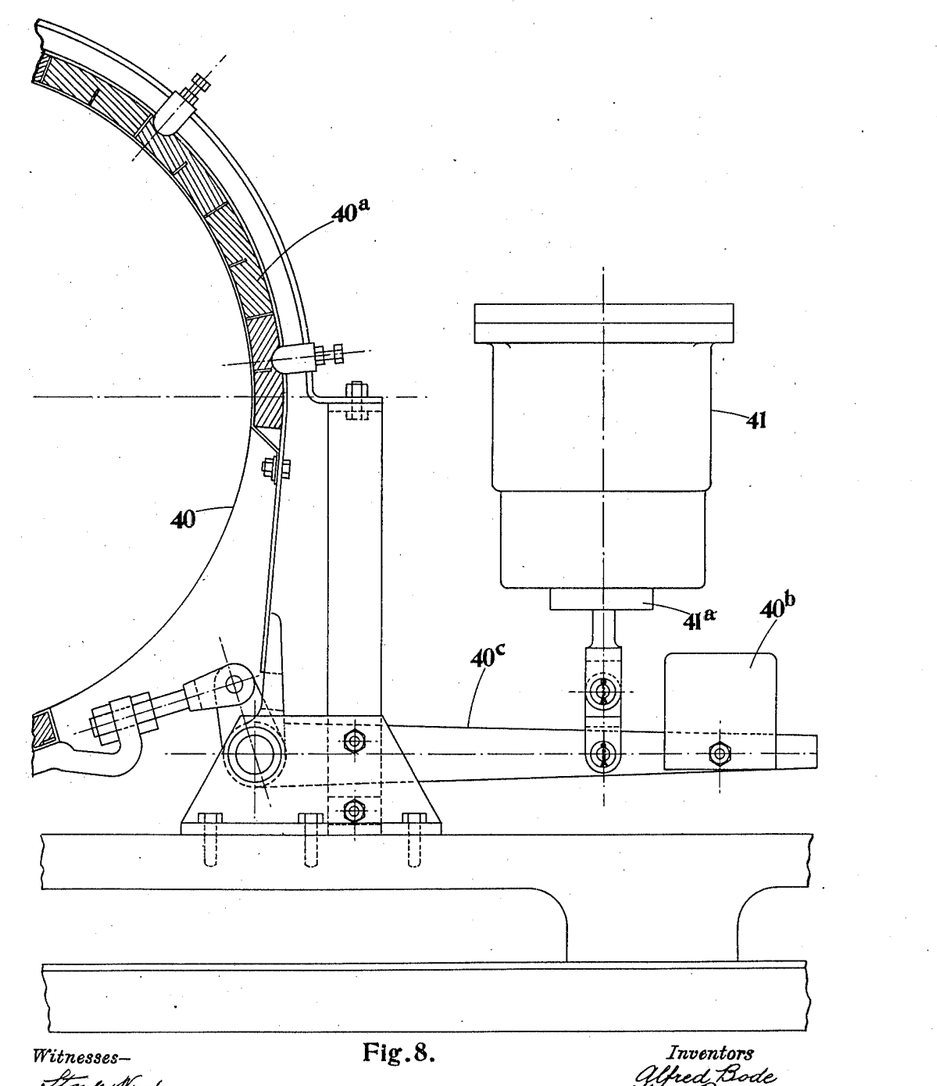

The shaft of the drum 1 is prolonged through the bearing 5 and upon it is mounted a friction coupling 25 whose periphery is fashioned as or furnished with a sprocket wheel geared by a chain 26 to another sprocket wheel 27. The chain also passes over a sprocket wheel 28ª Figs. 5, 6 and 7 mounted on the shaft 28ᵇ on which is also mounted a toothed wheel 28 gearing with a toothed wheel 29 mounted upon a stud 29ª fixed on the capstan frame 4ª and gearing in turn with a toothed wheel 30 keyed upon the shaft 4ᵇ of the capstan 4. The toothed wheel 28 has slidably mounted on its shaft 28ᵇ, but prevented from rotation, a worm 31 gearing with a worm wheel 32 mounted on a shaft 32ª arranged transversely of the frame of the capstan 4. This shaft extends beyond, and supports at the center of the capstan frame a sprocket wheel 34 which by a chain 50ª Figs. 5, 6 and 7 is geared to another sprocket wheel 34ª supported at the opposite end of the frame of the capstan 4. The distance apart of these sprocket wheels is equal to the travel of the capstan 4. One link of the chain 50ª is provided with a prolonged bolt or the like 36 which slides in a vertical guide 35 fastened to the bottom of the capstan frame. As the drums 1 and 2 are revolved the motion of the drum 1 is transmitted through the sprocket wheel 25, chain 26 and sprocket wheels 27 and 28ª to the toothed wheels 28, 29 and 30, and thus to the capstan 4 so as to revolve it and wind the rope 3, while at the same time motion is transmitted by the toothed wheel 28, worm 31, worm wheel 32, sprocket wheels 34 and 34ª and the chain 50ª for the purpose of moving the capstan 4 laterally so as to lay the rope 3 regularly around the said capstan 4. This is effected in the manner that on the movement of the chain 50ª by means of the sprocket wheels, the bolt 36 projecting from said chain moves the guide 35 and therewith also the capstan frame. When the capstan reaches the end of its lateral movement in one direction or the other the bolt 36 moves upward or downward in its vertical guide 35 while the chain 50ª passes around the sprocket wheels 34, 34ª and thus the direction of lateral movement of the capstan frame is changed.

As hereinbefore described the motors 7 and 8 operate also the mechanism for raising and lowering the jib, hence it is necessary to provide means for disconnecting the rope mechanism from the motors when it is required to operate only the jib mechanism and also means for disconnecting the latter mechanism when it is desired to operate only the rope mechanism. Friction couplings are particularly suitable for these purposes, consequently their use is exemplified, 37 denoting the coupling for controlling the rope mechanism and 42 that for the jib mechanism.

Figure 9:
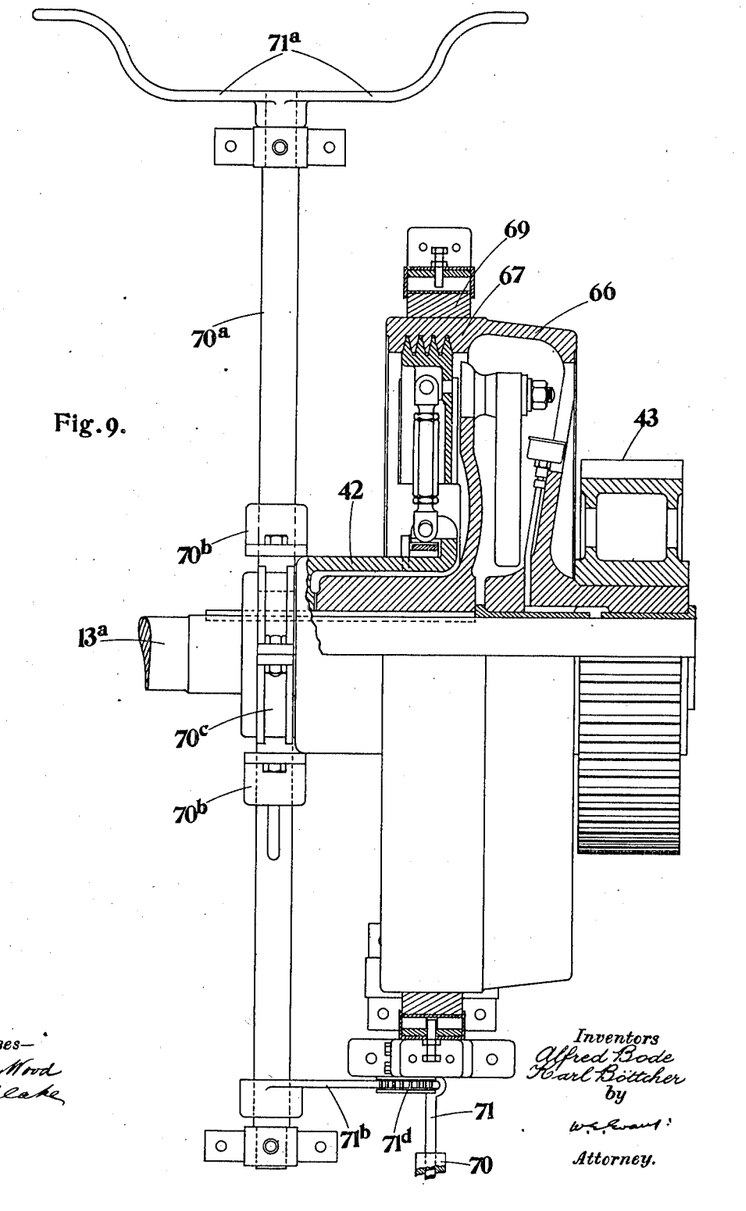
Figure 10:
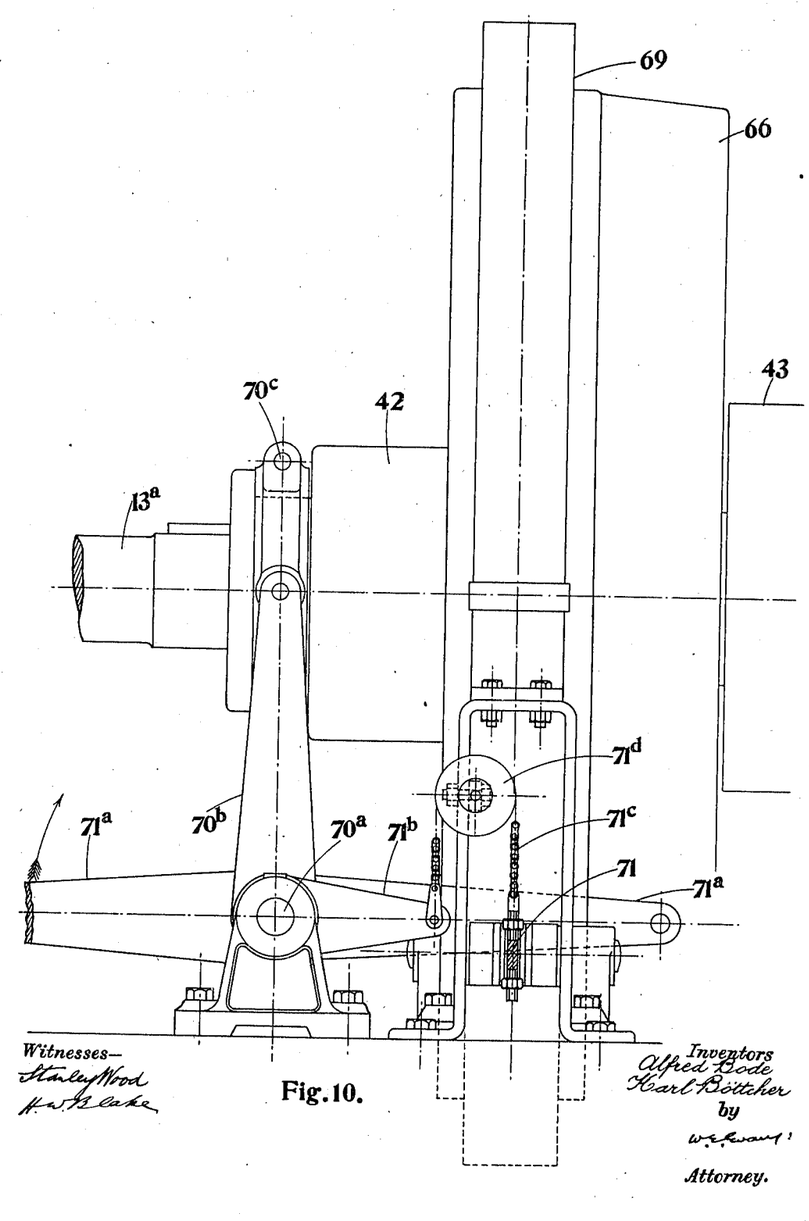
Figure 11:
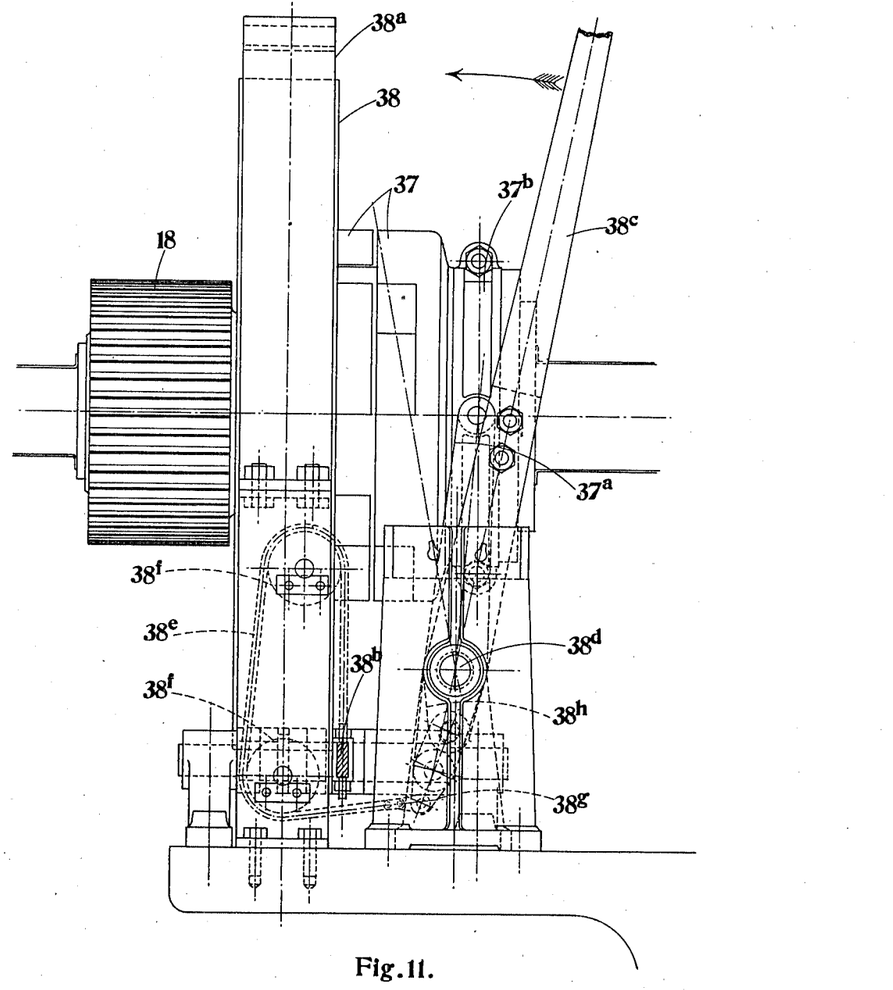

The coupling 37 which may be in the form of a friction clutch or dog clutch is situated between and upon the shaft of the wheels 13 and 18 and when out of engagement the drums 1 and 2 and the capstain 4 are disconnected from the motors 7 and 8. To prevent the falling of the hook 83, on the disengagement of the coupling 37 a brake sheave 38 is provided around which passes a band 38ª which is connected to a weight 39 arranged upon a weighted lever 38ᵇ in the usual manner and adapted to continually tend to tighten the brake band. The brake lever 38ᵇ is connected to a lever 38ᶜ pivoted on a shaft 38ᵈ by a chain 38ᵉ passing around pulleys 38ᶠ and a lever 38ᵍ pivoted to the said lever 38ᶜ and a lever arm 38ʰ keyed to a shaft 38ᵈ. On the shaft 38ᵈ are also keyed levers 37ª which are connected to a ring 37ᵇ passing around one of the members of the clutch 37. The connection of the lever 38ᶜ to the clutch 37 and the brake band 38ª is such that when the clutch 37 is in gear the brake band 38ª is released and when the clutch 37 is out of gear the brake is applied for example when moving the lever 38ᶜ in the direction of the arrow the clutch is brought into operation by the shaft 38ᵈ, the levers 37ª and the ring 37ᵇ and the brake band 38ª is released by the shaft 38ᵈ, arm 38ʰ, lever 38ᵍ, chain 38ᵉ and lever 38ᵇ, see Fig. 11. A magnetic brake is fitted at the opposite end of the shaft 13ª of the toothed wheels 13 and 14 upon a prolongation thereof. This comprises a brake sheave 40 coacting with a band 40ª attached to a weight 40ᵇ mounted upon a bell crank lever 40ᶜ connected to the band 40ª and also connected to the magnet core 41ª of the magnet 41 which is electrically connected with the source of energy of the motors 7 and 8, in such manner that when the current is switched to the said motors the magnet 41 is energized and the band released from the sheave 40. The coupling 42, 66 is also situated upon the prolongation of the shaft 13ª of the two toothed wheels 13 and 14 one portion 42 being keyed thereto while the other portion 66 is loosely mounted thereon and is connected to a toothed wheel 43 constituting the first transmitting element of the jib mechanism. The coupling member 66 (Figs. 9 and 10) is further furnished with a brake comprising a sheave 67, a band 69 and a weight 70 connected with a lever 71 under the control of the driver at his platform or cab by the hand levers 71ª and adapted to bring the coupling 42 into gear when the brake is removed. For this purpose the hand levers 71ª are advantageously keyed to a shaft 70ª on which are keyed levers 70ᵇ connected to a ring 70ᶜ provided on the clutch member 42. To the shaft 70ª is also keyed a lever 71ᵇ which by means of a chain 71ᶜ, passing around the guide pulley 71ᵈ, is connected to the lever 71. The relative disposition of the levers 70ᵇ to the lever 71ᵇ is such that on the movement of the hand levers 71ª in the direction of the arrow (Fig. 10) the clutch member 42 is brought into engagement with the clutch member 66 and the weight 70 is raised thus disengaging the brake from the brake disk 67. This jib mechanism is constituted as follows:—The toothed wheel 43 on the member 66 of the coupling 42 gears with a toothed wheel 44 mounted on a spindle supported in brackets and this wheel 44 in turns gears with a toothed wheel 45 keyed on a shaft 46, and led to, and through, the shaft of the drum 2 by which it is further supported and which is made hollow for the purpose. At the outer side of each of the bearings 5 and 6 supporting the drums 1 and 2 bevel wheels 47 and 48 are mounted on the shaft 46 to gear with corresponding wheels 49 and 50 mounted on vertical shafts 51 and 52. Above the bevel wheels 49 and 50 toothed wheels 53 are mounted upon the shafts 51 and 52 and in a carriage 56ª sliding in a guide way upon the structure of the crane. The wheels 53 gear with wheels 54 keyed to two screwed spindles 55 supported in nuts 56 connected to the structure of the crane, and in other nuts above them, and which nuts are mounted in a sliding carriage 84 connected to the jib 82 by ties 85 or otherwise suitable and as is customary. Thus when the motors 7 and 8 are working, and assuming the coupling 37 is out of gear and the coupling 42 is in gear, then the wheel 43 is revolved by either the wheels 9, 10 and 14 and the clutch 17¹ or the wheels 11, 12 and 13 and clutch 16¹ and thence the motion is transmitted to the screwed spindles 55 by wheels 44, 45, 47, 48, 49, 50, 53 and 54 to raise or lower the jib, without the drums 1 and 2 and the capstan 4 being operated. Supposing however, both couplings 37 and 42 are in gear, then not only are the drums 1 and 2 and capstan 4 revolved, but the spindles 55 are rotated, the arrangement being such that when the jib is raised the rope 3 is unwound from the drums 1 and 2 and capstan 4, while the rope 3 is wound when the jib is lowered, and at every movement of the jib so much rope is wound off or on so that the suspended load is during the movement of the jib only moved in a horizontal direction and not vertically.

Figure 1:
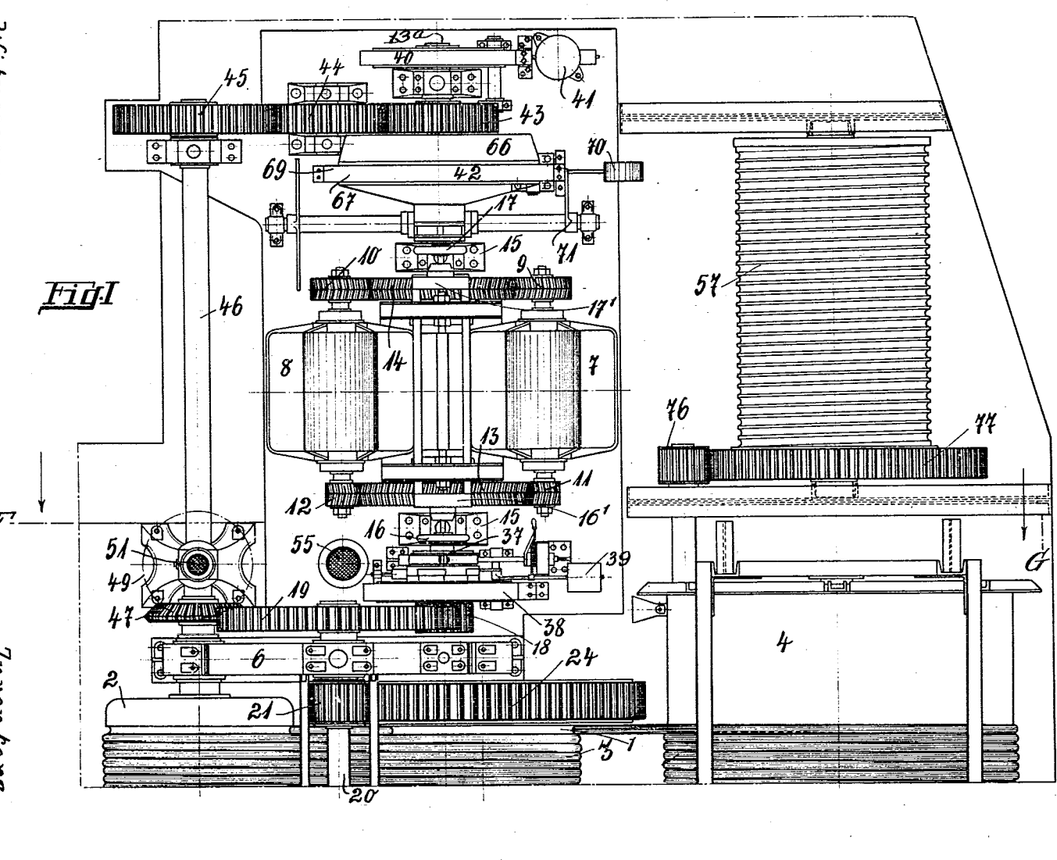
Figures 1 and 2 show a sectional plan.
Figure 2:
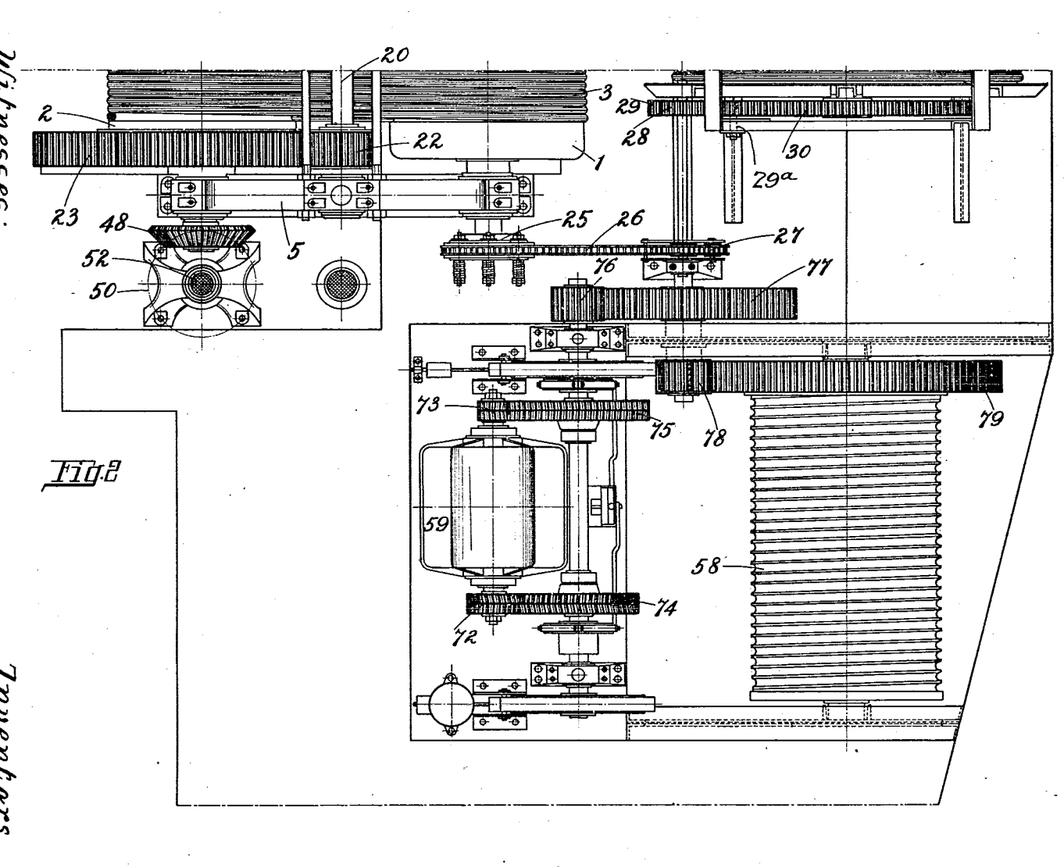
Figure 3:
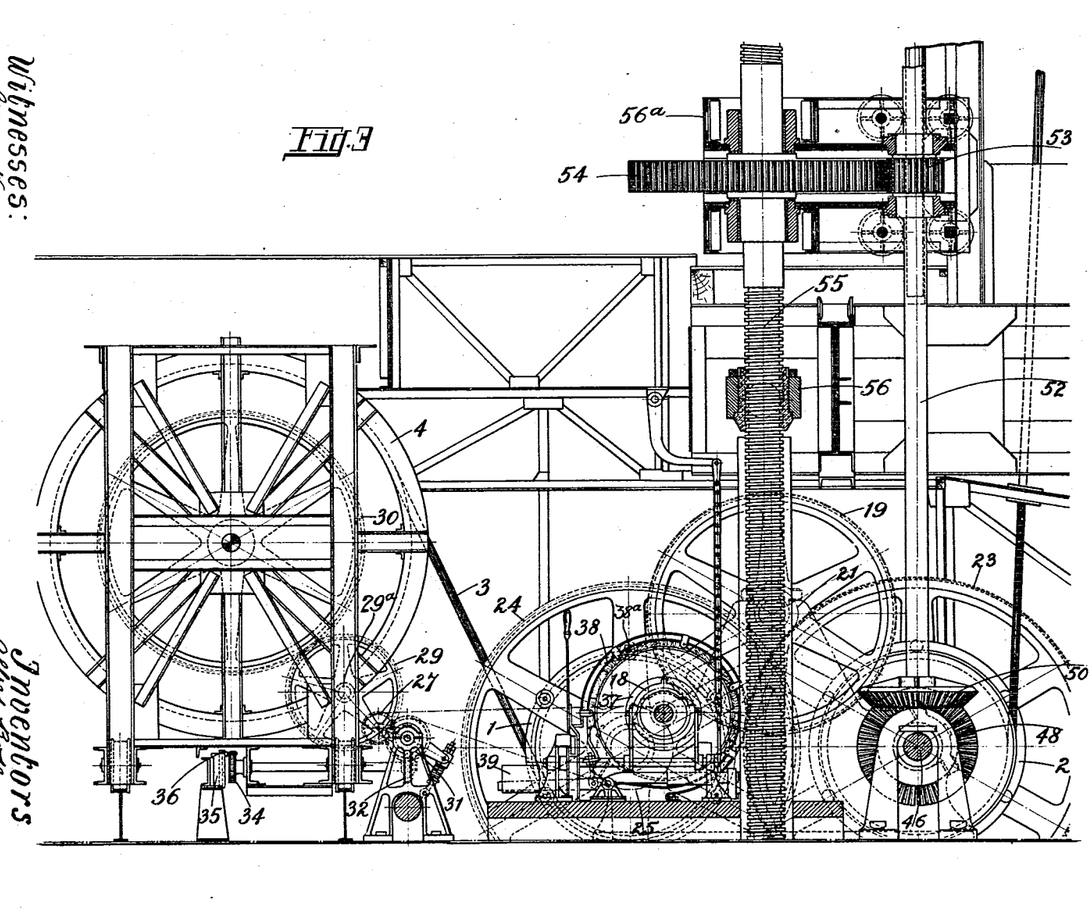
Fig. 3 is a sectional elevation on the line F—G in Fig. 1.
Figure 4:
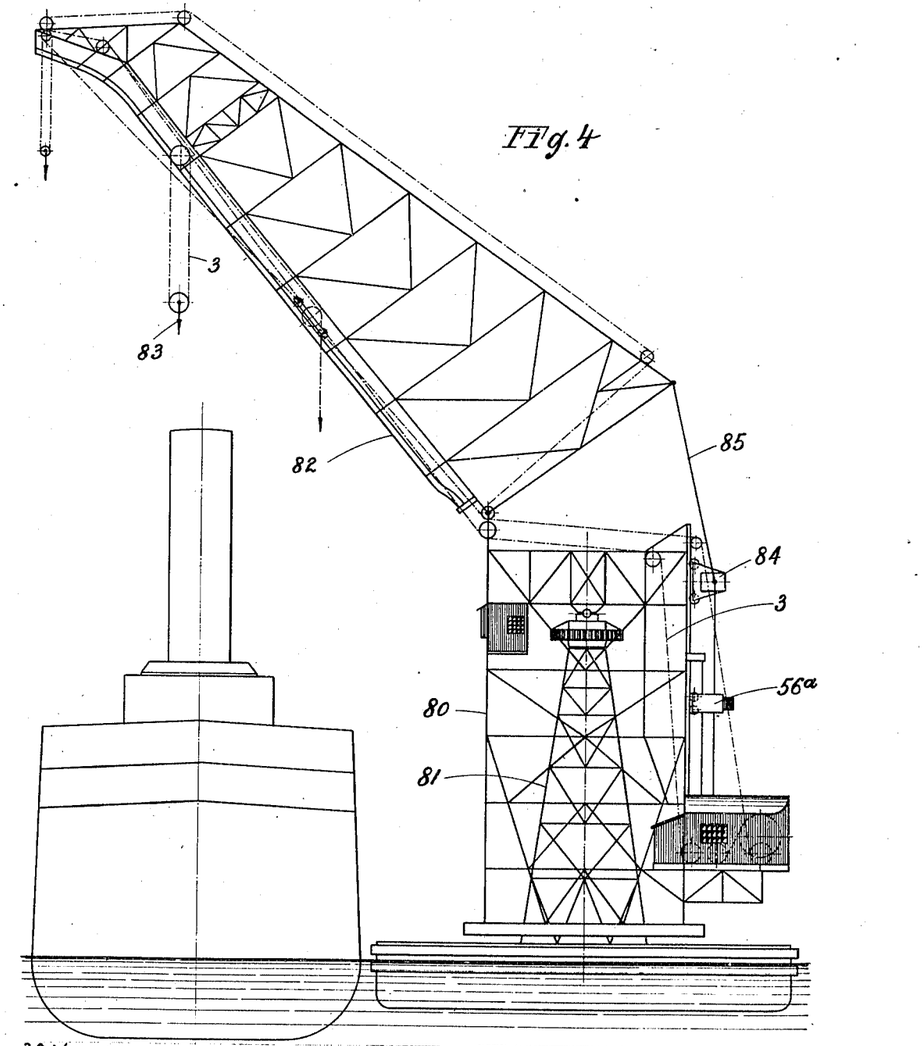
Fig. 4 is an elevation of the crane to a smaller scale.

Mechanism for operating the rope of the hook for lighter loads is also shown in the drawings, most clearly in Figs. 1 and 2. This mechanism comprises a pair of drums 57 and 58 driven by a motor 59 through gearing of ordinary kind and arrangement as indicated at 72, 73, 74, 75, 76, 77, 78 and 79. The gearing 72 is duplicated to give different speeds of drive.

What we claim as our invention and desire to secure by Letters Patent is:—

1. In a crane, mechanism for operating the rope of the main or heavy load hook comprising, in combination, drums upon which said rope is wound and unwound, a capstan upon which the slack of said rope is wound and unwound, and means for simultaneously operating said drums and capstan, and means for laterally moving said capstan to lay said rope.

2. In a crane, mechanism for operating the rope of the main or heavy-load hook comprising, in combination, electric motors, drums upon which said rope is wound and unwound, a capstan upon which the slack of said rope is wound and unwound, gearing between said motors and said drums driving said drums, gearing between one of said drums and said capstan driving said capstan simultaneously with said drums, and means for laterally moving said capstan to lay said rope.

3. In a crane, mechanism for operating the rope of the main or heavy-load hook comprising, in combination, electric motors, drums upon which said rope is wound and unwound, a capstan upon which the slack of said rope is wound and unwound, gearing between said motors and said drums driving said drums, gearing between one of said drums, and said capstan driving said capstan simultaneously with said drums, and means for laterally moving said capstan to lay said rope, comprising worm gearing in connection with the gear for driving the capstan, chain gearing in connection with the worm gearing, a bolt provided on the chain gearing and a guide on the frame of the capstan in connection with the bolt on chain.

4. In a crane, the mechanism for operating the rope of the main or heavy-load hook and for raising and lowering the jib comprising, in combination, drums upon which said rope is wound and unwound, a capstan upon which the slack of said rope is wound and unwound, rotatable spindles actuating said jib, and means for operating said drums and said capstan and said spindles simultaneously, or only said drums and said capstan, or only said spindles.

5. In a crane, mechanism for operating the rope of the main or heavy-load hook and for raising and lowering the jib comprising, in combination, electric motors, drums upon which said rope is wound and unwound, a capstan upon which the slack of said rope is wound and unwound, rotatable screwed spindles, actuating said jib, stationary nuts for said spindles, gearing between said motors and said drums driving said drums, gearing between one of said drums and said capstan driving said capstan simultaneously with said drums, gearing between said motors and said spindles, actuating said spindles, and couplings for connecting and disconnecting said gearing between said motors and said drums and between said motors and said spindles for operating said drums and capstan and said spindles simultaneously, or only said drums and said capstan, or said spindles only, substantially as described.

In testimony whereof we have signed our names to the specification in the presence of two subscribing witnesses.

ALFRED BODE.
KARL BÖTTCHER.

Witnesses:
LOUIS VANDORY,
ARTHUR E. ADAMS.